Patented July 6, 1943

2,323,509

UNITED STATES PATENT OFFICE 2,323,509

PROCESS OF PROMOTING PLANT GROWTH

Dell Alvos, Guadalupe, Calif.

No Drawing. Application June 23, 1941,
Serial No. 399,399

4 Claims. (Cl. 47—58)

My invention relates to agriculture, and the principal object of my invention is to provide a process of promoting plant growth. Plant growth is promoted by adding to the soil in which it grows certain elements needed for such growth such as nitrogen, phosphorous, etc., which are contained in compounds such as phosphates, nitrates, etc., in the form of fertilizers. My invention is not intended to supply such fertilizers but is intended to correct certain conditions that retard plant growth even where adequate fertilizer is present. The first of these retarding influences is excessive alkalinity.

There exist in the United States large areas of farm land that carry alkaline salts in sufficient amounts to retard and in some cases to entirely prevent the growth of many crops to which such land would be well adapted were it not for this alkalinity, and it is an object of my invention to provide a process for treating such alkaline land to reduce the alkalinity to a point where crops may be profitably grown thereon.

This alkalinity is often due to the use of irrigation water which is of itself not highly alkaline but which, nevertheless, contains some alkaline salts. Due to long continued use of such water and the continual deposition of such salts on the land, the alkalinity of the soil steadily increases until it becomes so alkaline that crop growth is retarded. It is a further object of my invention to correct the alkalinity of such irrigating water so that it will not only not add to the alkalinity of the soil, but will gradually neutralize alkalinity existing in the soil to which such irrigating water is applied.

One of the principal agencies retarding plant growth is the existing living organisms which act as parasites and tend to retard growth and in some cases actually destroy the crops. Such living organisms may themselves be plants, like the molds and other fungus spores, or growths or animals, like bacteria and certain insects. Although not of universal application, it is a rather general rule that life seems to thrive best in alkali media. It is a further object of my invention to provide a process of promoting crop growth by retarding or preventing the growth of living organisms which are inimical to such crop growth.

Further objects and advantages will be made evident hereinafter.

It is well known that sulphur can be used to advantage as an insecticide and fungicide, and various sulphur compounds have been used for this purpose. Elemental sulphur has been used but it is relatively ineffective, as sulphur itself is not water soluble and cannot act as a poison in its elemental and solid state. Where elemental sulphur has been used successfully as an insecticide or fungicide, this success is probably due to the formation of sulphur compounds by oxidation or other reactions that produce water-soluble sulphur compounds, these reactions occurring after or during the time of application of the elemental sulphur to the plant. These sulphur compounds, and especially the oxides, form acids, notably sulphurous and sulphuric acid, both of which act as insecticides and fungicides and both of which tend to neutralize the alkalinity of substances with which it is mixed.

In the practice of my invention I use sulphur dioxide as a soil corrective and fungicide and insecticide. Sulphur dioxide is a gas at atmospheric temperatures and pressures, but may be bought on the open market as a liquid under pressure in closed cylinders, and is used by me in this form. The gas is readily soluble in water and may be readily supplied to the crops by dissolving it in irrigating water. In practice I release the gas from the cylinder supply through a suitable valve and through a perforated pipe immersed in the stream of irrigating water as it flows to the crops. With even a few inches of pipe submersion, I have found that sufficient sulphur dioxide gas can be dissolved in the irrigating water to produce the results I desire.

The amount of sulphur dioxide which is necessary to produce these results may be determined by observing and regulating the hydrogen ion concentration of the solution of sulphur dioxide in the water.

Regardless of its value as a fungicide and insecticide, it is highly desirable that the alkalinity of the soil about the plant roots be kept within good growing limits. In practice I carefully sample this soil at a number of points over the area to be treated, thoroughly mix these samples to produce a test sample, and then mix with the test sample water containing a known percentage of sulphur dioxide in solution to produce a thick mud. This mud should have a hydrogen ion concentration of between 5.2 pH and 7.6 pH to produce the best growing results, and I prefer to use a sulphur dioxide solution as an irrigating medium which will produce a hydrogen ion concentration between the limits as determined by my mud tests. Higher concentrations may not be harmful but are uneconomical and in most cases unnecessary as far as correction of soil alkalinity is concerned.

Too high a concentration of sulphur dioxide may, however, be harmful to plants due to its dehydrating effect and its action as a disinfectant. The sulphur dioxide is carried by the irrigating water to the crops and into the soil where it reacts directly with any soluble alkaline substances which dissolve in the water. These alkaline substances are quite generally hydroxides. This is true where fertilizers have been used containing hydroxides such as ammonium hydroxide. Such fertilizers are in common use, and while the ammonia tends to promote plant growth, ammonium hydroxides and similar substances tend to alkalize the soil. The correction of the alkalinity of the soil is promoted by the presence of some sulphur trioxide in the irrigating water, the trioxide radical uniting with the hydroxyl radical of the fertilizer to form water and free sulphur dioxide. Sulphur trioxide may be present initially in the gas used or it may be formed by reactions occurring in the water or in the soil.

The insecticidal and fungicidal action of the sulphur dioxide is, of course, increased as additional amounts of sulphur dioxide are added to the irrigating water, but if too much is added it may injure the plants themselves. I have found that for an ordinary irrigation of tender plants, such as lettuce, an application of 30 to 50 pounds of sulphur dioxide per acre irrigation is not harmful.

Sulphur dioxide is an active fungicide and to some extent a germicide and insecticide. It has the property of escaping slowly from its solution, with the result that land saturated with irrigating water with sulphur dioxide in solution slowly gives up sulphur dioxide as a gas. This gas is heavier than air and tends to cling to the surface of the ground and lie in cavities formed in or around the plant below or slightly above ground level. It is not only toxic to certain spores and fungi, but by the exclusion of oxygen acts to prevent the development of some organisms as to which it is not truly toxic.

A field treated as described above retains traces of sulphur dioxide over considerable periods and in some cases for a period longer than that usually occurring between successive irrigations. This slow evaporation of sulphur dioxide is, of course, promoted by the evaporation of water from the field.

I am not a chemist and certain chemists whom I have consulted are not in entire agreement as to the above-stated theory. I know that by applying as described above sulphur dioxide to certain field crops substantially greater yields are obtained than on adjoining control plots which are irrigated in exactly the same manner and to the same extent with water containing no sulphur dioxide.

The process is easy to use in practice, as the irrigation water has the sulphur dioxide dissolved therein as it flows to the field upon which it is distributed in an amount consistent with, and in the same manner that said water would be distributed in accordance with, good irrigation practice.

The process has a decidedly good effect on the physical characteristics of the soil which has been treated by it as it renders the soil more porous and flocculent and tends to destroy hard pan and plow pan, thus aiding in the leaching and drainage of the soil. This porous soil is easily tilled and cultivated.

The process is particularly applicable to so-called old and worn out fields which have been gradually alkalized either by alkalies carried in surface or irrigation water or by long continued use of alkalizing fertilizers. It is quite efficient in controlling mold spores, bacteria, mildew, and other variable fungi, or other conditions inimical to crop growth which are due to or depend upon an alkali media for their growth or continuance. It is an insect deterrent, if not an active insecticide.

I claim as my invention:

1. The process of treating land for the purpose of promoting plant growth which comprises: dissolving sulphur dioxide in water of sufficient volume to provide adequate irrigation of said land; and thereafter applying the solution so formed to the land in accordance with good irrigation practice, the amount of sulphur dioxide so supplied to the irrigation water being sufficient to produce a hydrogen ion concentration about the roots of the plants on the land after irrigation having a value of from 5.2 to 7.6 pH.

2. The process of correcting alkalinity in the soil, which comprises saturating the soil with water containing dissolved sulphur dioxide, the quantity of sulphur dioxide so used being sufficient to provide a hydrogen ion concentration of from 5.2 to 7.6 pH in the soil after saturation.

3. The process of treating land for the purpose of promoting plant growth which comprises: dissolving sulphur dioxide in water of sufficient volume to provide adequate irrigation of said land by injecting the sulphur dioxide as a gas into the water immediately prior to its use on the land, the quantity of gas used being sufficient to provide a hydrogen ion concentration of from 5.2 to 7.6 pH in the soil to be irrigated after irrigation; and thereafter applying the solution so formed to the land in accordance with good irrigation practice.

4. The process of treating land for the purpose of promoting plant growth which comprises: dissolving sulphur dioxide in water of sufficient volume to provide adequate irrigation of said land by injecting the sulphur dioxide as a gas into the water immediately prior to its use on the land, the quantity of gas used being sufficient to provide a hydrogen ion concentration of from 5.2 to 7.6 pH in the soil to be irrigated after irrigation; and thereafter applying the solution so formed to the land in accordance with good irrigation practice, the amount of sulphur dioxide dissolved in the water being sufficient to supply thirty pounds or more of sulphur dioxide to the irrigation water supplied to each acre of land in each irrigation thereof treated.

DELL ALVOS.